United States Patent [19]

Benedyk

[11] Patent Number: 5,458,393
[45] Date of Patent: Oct. 17, 1995

[54] SPACE FRAME APPARATUS AND PROCESS FOR THE MANUFACTURE OF SAME

[75] Inventor: Joseph C. Benedyk, Lake Zurich, Ill.

[73] Assignee: Alumax Extrusions, Inc., West Chicago, Ill.

[21] Appl. No.: 105,368

[22] Filed: Aug. 11, 1993

[51] Int. Cl.⁶ ..................................................... B60R 27/00
[52] U.S. Cl. ........................... 296/203; 296/205; 280/798
[58] Field of Search .................................. 296/205, 203; 280/796, 785, 798

[56] References Cited

U.S. PATENT DOCUMENTS

| | | | |
|---|---|---|---|
| 2,107,382 | 2/1938 | Maddock | 280/798 X |
| 2,174,922 | 10/1939 | Kuiper | 280/798 X |
| 2,194,349 | 3/1940 | Almdale | 280/798 |
| 4,735,355 | 4/1988 | Browning | 228/189 |
| 4,766,664 | 8/1988 | Benedyk | 29/512 |
| 4,907,735 | 3/1990 | Ushioda | 228/173.4 |

FOREIGN PATENT DOCUMENTS

| | | |
|---|---|---|
| 2131361A | 8/1984 | United Kingdom . |
| 89306589.6 | 1/1990 | United Kingdom . |

OTHER PUBLICATIONS

P. 28 of May 1991 issue of Materials Engineering Magazine.

*Primary Examiner*—Joseph D. Pape
*Attorney, Agent, or Firm*—Dick and Harris

[57] ABSTRACT

A space frame apparatus, and process for constructing same, for use in the construction of various vehicles. The apparatus comprises one or more continuous outer frame members, each fabricated from a single longitudinal extrusion, and one or more cross-members. The extrusions include a predetermined number of slots for operable acceptance of the ends of the corresponding cross-members, as well as a predetermined number of regions softened through a localized heat induction process. The softened regions are bent to varying radii in predetermined directions relative to the profile of a specific vehicle configuration and then allowed to harden back toward their pre-softened hardness. The ends of the cross-members are also softened through a localized heat induction process, and then deformed so as to create a collar and flange portion operably positioned on opposite sides of each respective slot for securely maintaining the cross-members to the one or more continuous outer frame members.

18 Claims, 3 Drawing Sheets

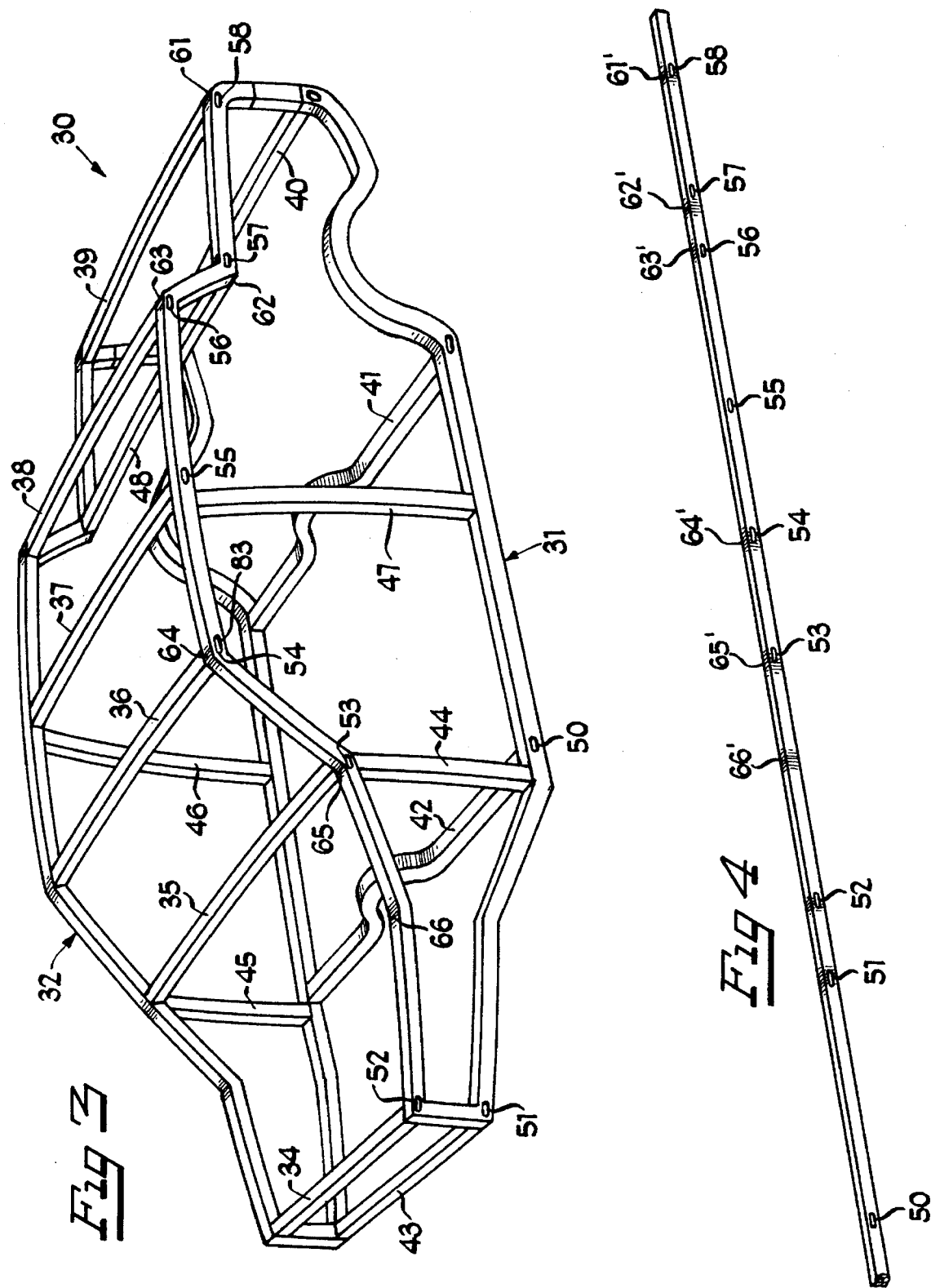

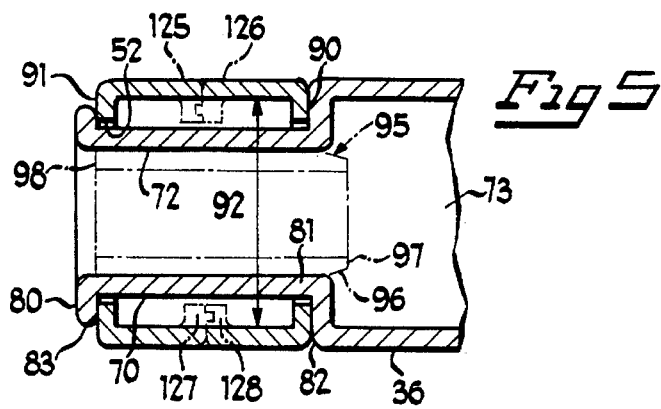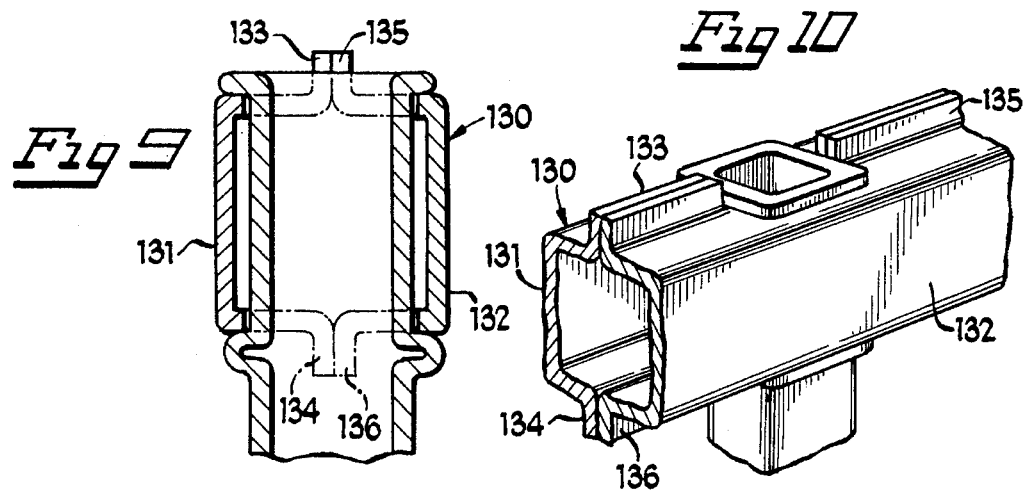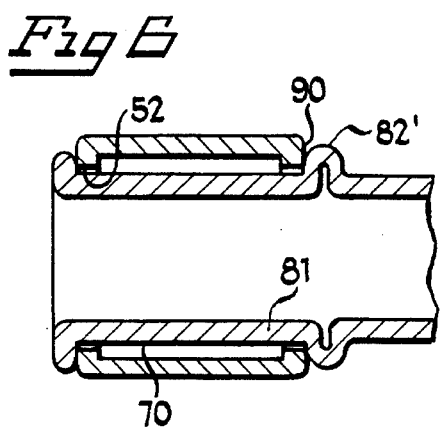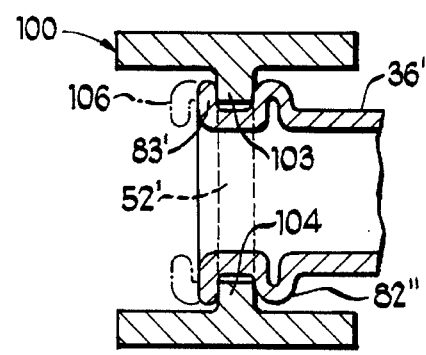

SPACE FRAME APPARATUS AND PROCESS FOR THE MANUFACTURE OF SAME

BACKGROUND OF THE INVENTION

The present invention relates in general to frame structures, and, more particularly, to space frame apparatuses, and the process for manufacturing same, wherein such a space frame apparatus is used in the construction of various vehicles, such as automotive and aviation vehicles, and wherein the space frame apparatus is intended to structurally bear a substantial load of such a vehicle when fully assembled.

Space frame structures for use in the construction of vehicles have been know in the art for several years. Typically, such space frames have been constructed from a plurality of individual aluminum alloy extrusions which are joined together at nodes generally fabricated from cast or wrought shapes. Each of the nodes generally comprise three to four connecting regions which each fit into the hollow sections of the ends of corresponding ones of the individual extrusions. The ends of the extrusions may then be secured to the respective nodes through welding or adhesive bonding. Two examples of such a node-type construction can be found in Browning, U.S. Pat. No. 4,735,355, and, in an article in the May, 1991 Materials Engineering Magazine, referring to "Automotive Aluminum."

Although use of nodes for attachment of individual, segmented extrusions, have indeed been utilized, such a construction has resulted in concerns relative to the structural integrity of such connections—especially inasmuch as both welds and adhesive bonding have a tendency to fatigue upon exposure of excessive vibration and stress typically imparted to such connections during normal operation of a vehicle employing such a space frame structure. Furthermore, when nodes, or the like, are used in a space frame, the space frame requires numerous individual extruded frame segments and numerous nodes for connection therewith. Accordingly, the costs associated with such a construction, coupled with concerns from a structural perspective, have resulted in the need for a better alternative.

Although the above-identified prior art utilizes a plurality of individual, segmented frame portions in combination with connecting nodes, other prior art space frames have been constructed from continuous frame portions, without reliance upon nodes. One example of such prior art is Malmurno, U.K. Pat. Apln. GB 2 131 361 A. Although Malmurno does utilize continuous frame portions, the cross-members which maintain the outer frame portions in an erected orientation appear to be merely welded to the frame. Accordingly, the same concerns pertaining to fatigue of the connection between the cross-member and the outer frame portions persist—even without the use of nodes.

Although prior art space frames disclose continuous outer frame portions, as well as means for connecting cross-members to the frames, none of such prior art teaches, much less discloses, one or more continuous outer frame portions which include preliminarily pre-softened regions, which are softened through localized heat induction, and, wherein the one or more continuous outer frame portions are then bendable to varying radii in any predetermined direction relative to a particular vehicle configuration. Furthermore, none of such prior art teaches, much less discloses attachment of cross-members to the continuous outer frame portions of a space frame wherein the respective ends of the cross-members are insertable into corresponding slots within the continuous frame portions, and wherein the ends of the cross-members include a flange and collar portion each formed upon softening through localized heat induction and then deformation—for purposes of securely pinching the cross-member to the inner and outer peripheral surfaces of the corresponding slots.

It is thus an object of the present invention to provide a space frame apparatus constructed from one or more continuous outer frame portions which are secured in an erected orientation through cooperation with one or more cross-members—without reliance upon separate connecting elements, or nodes.

It is also an object of the present invention to provide a space frame apparatus wherein secured connection of the one or more cross-members to the one or more continuous outer frame portions is maintained by a compression fit between the flange and collar portion of the ends of the cross-members about the inner and outer peripheral surfaces of the corresponding slot shoulders, and wherein such flange and collar portions are formed by softening the distal and proximal ends of the cross-members through localized heat induction and then deforming same into such a flange and collar configuration.

It is still further an object of the present invention to provide a space frame apparatus wherein the one or more continuous outer frame portions are constructed from aluminum extrusions which have a plurality of predetermined areas pre-softened through localized heating so that continuous extrusions can be bent to varying predetermined radii in predetermined directions relative to a specific vehicle configuration, and wherein the bent regions are then allowed to harden toward their original hardness.

It is yet another object of the present invention to provide a space frame apparatus having superior structural integrity at the connecting joint between the cross-members and the continuous outer frame portions, and which can be manufactured at relatively low costs.

These and other objects of the present invention will become apparent in light of the present Specification, Claims and Drawings.

SUMMARY OF THE INVENTION

The present invention comprises a space frame apparatus for use in the construction of various vehicles, such as automotive and aviation vehicles, wherein the space frame apparatus is intended to structurally bear a substantial load of such a vehicle when fully assembled.

The space frame apparatus includes one or more continuous outer frame means, having one or more pre-selected attachment regions, for providing an outer frame for a vehicle, and one or more cross-member means each having at least a first end operably attached to the one or more frame means at corresponding ones of the one or more pre-selected attachment regions. Such cross-member means serve to increase the structural rigidity of the apparatus, as well as to enable articulation of the one or more continuous outer frame means into an erected orientation.

Slot means, having an inner and outer peripheral surface, are integrally formed through at least a portion of the one or more pre-selected attachment regions for operably accepting at least a portion of corresponding respective ones of the at least first ends of the one or more cross-member means. Securement means are operably associated with at least a portion of each of the first ends of the one or more cross-member means and the corresponding slot means for operably securing the first ends within the corresponding slots means, to, in turn, securely maintain the space frame apparatus in the erected orientation. The securement means further include at least a portion of the first ends of the cross-member means being softened through localized heating, and then deformed, so as to maintain the restrained operable positioning of the first end within the corresponding slot means.

In the preferred embodiment of the invention, the operable acceptance of the first ends of the cross-member means within the corresponding slot means describes a joint therebetween the cross-member means and the one or more continuous outer frame means. Furthermore, strength enhancement means are operably associated with the joint for imparting increased structural integrity thereto, to, in turn, increase rigidity against imparted stress at the joint.

In this preferred embodiment of the invention, the one or more cross-member means further includes an interior surface defining a channel region and a wall having a finite thickness. The strength enhancement means comprises at least one sleeve member, or ferrule, operably positioned within at least a portion of the channel region of the one or more cross-member means adjacent the interior surface of at least the first end of same—so as to reinforce the finite wall thickness of the cross-member means within the joint.

Each of the at least first ends of the one or more cross-member means have an inner dimension, and, the at least one sleeve member has an outer dimension so as to collectively describe an interference fit therebetween. Accordingly, the interference fit additionally serves to maintain the sleeve member within at least a portion of the channel region of the first end of a corresponding one of the one or more cross-member means.

In one preferred embodiment of the invention, the sleeve member includes an inner edge operably positioned within the channel region of a corresponding one of the at least first ends of the one or more cross-member means, and an outer edge extending through and past a corresponding one of the slot means.

The securement means further includes at least a portion of the outer edge of the sleeve member being softened through localized heating, and then deformed, so as to result in a flange portion operably positioned adjacent the outer peripheral surface of the slot means to, in turn, further enhance securement of respective ones of the at least first ends of the one or more cross-member means within the corresponding slot means.

The at least first ends of the more or more cross-member means each include a proximal end operably positionable adjacent the inner peripheral surface of the slot means. Each of the proximal ends may be softened through localized heating, and then deformed, so as to form a detent, or collar portion, adjacent the inner peripheral surface of a corresponding one of the slot means.

In one embodiment of the invention, the slot means have an inner dimension, and each of the at least first ends of the one or more cross-member means have an outer dimension so as to collectively describe an interference fit therebetween. The interference fit serves to maintain at least a portion of the first ends of the one or more cross-member means within at least a portion of a corresponding one of the slot means.

In the preferred embodiment of the invention, the at least first ends of the one or more cross-member means each include a distal end and a proximal end wherein the distal end extends through and past the corresponding slot means in which the first end is positioned. The securement means further includes the distal and proximal ends being softened through localized heating, and then deformed, so as to form a detent, or collar portion, adjacent the inner peripheral surface of a corresponding one of the slot means, and, one or more flanged regions operably positioned adjacent the outer peripheral surface of the corresponding slot means. Accordingly, such a flange/collar configuration creates a substantially locked joint relative to the at least first end of the one or more cross-member means and the corresponding slot means.

In another preferred embodiment of the invention, the one or more continuous outer frame means comprise two or more continuous outer frame portions. The two or more continuous outer frame portions include one or more pre-softened regions softened through localized heating for facilitating bending of the two or more continuous outer frame portions at varying radii in any desired direction. Each of these continuous outer frame means may be constructed from a single unitary member, or, alternatively, from a first half and a second half which are operably secured together so as to collectively form a unitary frame portion.

In the preferred embodiment of the invention, the one or more continuous outer frame means and the one or more cross-member means are each constructed of an aluminum material from the group comprising 6000-series alloys of varying hardnesses, such as a 6061-T6 aluminum alloy.

The invention includes the process of manufacturing a space frame apparatus wherein the space frame apparatus is constructed with one or more bendable outer frame members having pre-selected attachment regions located thereon. The process includes the steps of a) forming slots in the one or more bendable outer frame members at the pre-selected attachment regions, wherein the slots include an inner peripheral surface and an outer peripheral surface; b) softening predetermined areas on the one or more outer frame members through localized heating; c) bending the one or more bendable outer frame members at each of the predetermined areas to varying predetermined radii in predetermined directions relative to a specific vehicle configuration; d) at least partially hardening the predetermined softened areas after bending the one or more bendable outer frame members so as to increase structural integrity to the predetermined areas; e) forming at least one cross-member with at least a first end having a distal end, a proximal end and a cross-sectional configuration; f) softening the proximal ends of the at least one cross-member through localized heating; g) deforming at least a portion of the softened proximal ends of each of the first ends so as to alter the pre-deformed cross-sectional configuration of same, to, in turn, create a detent portion operably positioned adjacent the inner peripheral surface of a corresponding slot for precluding over insertion of the first ends into the corresponding slots in the one or more outer frame members; h) inserting the first end of the at least one cross-member in a corresponding one of the slots in the bent one or more outer frame members so as to form a joint therebetween each respectively; and i) hardening the locally softened proximal ends back toward the pre-softened hardness.

In the preferred embodiment of the invention, the process for manufacturing a space frame apparatus further includes the steps of softening the distal ends of the first ends of the at least one cross-member through localized heating; deforming at least a portion of the softened distal ends of the first ends of the at least one cross-member so as to form a flange portion operably positioned adjacent the outer peripheral surface of corresponding ones of the slots; and, hardening the locally softened distal ends back toward their pre-softened hardness, after the step of softening the proximal ends of the at least one cross-member through localized heating. Accordingly, these flanged portions, in cooperation with the detent/collar portions, serve to lockably secure the cross-members to the continuous outer frame members by way of a compression fit.

In another embodiment of the invention, the process of manufacturing a space frame apparatus further includes the step of increasing structural integrity to the joint after the step of forming the at least one cross-member. This step of increasing the structural integrity to the joint comprises the step of inserting at least a portion of a sleeve member, or ferrule, within at least a portion of the at least first end of the at least one cross-member prior to the step of inserting the at least first end of the at least one cross-member in corresponding ones of the slots.

In this preferred embodiment, the sleeve member includes an outer end and an inner end, and the at least first ends of the at least one cross-member includes a channel region. The step of inserting the at least first ends of the at least one cross-member in corresponding ones of the slots further includes the steps of inserting the inner end of the sleeve member within the channel regions of the at least one cross-member; inserting the at least first ends of the at least one cross-members, and, in turn, the sleeve member, into a corresponding one of the slots until at least a predetermined portion of the outer end of the sleeve member extends past the outer peripheral surface of a corresponding one of the slots; softening the outer end of the sleeve member through localized heating; deforming at least a portion of the softened outer end of the sleeve member so as to form a flange portion operably positioned adjacent the outer peripheral surface of the corresponding slot; and hardening the locally softened outer end of the sleeve member back toward its pre-softened hardness.

In yet another embodiment, the process of manufacturing a space frame apparatus further includes the steps of extruding a billet so as to form one or more substantially straight extrusions to be used as the one or more bendable outer frame members, prior to the step of forming slots in the one or more bendable outer frame members at the pre-selected attachment regions. In addition, the step of bending the one or more bendable outer frame members at each of the predetermined areas to varying predetermined radii in predetermined directions relative to a specific vehicle configuration further includes the step of positioning the bent portions of the one or more bendable outer frame members in any desired dimension, so as to form a space frame apparatus constructed from one or more continuous outer frame members.

BRIEF DESCRIPTION OF THE DRAWINGS

FIG. 3 of the drawings is a perspective view of the present space frame apparatus showing, in particular, the substantially uninterrupted continuous outer frame means, the cross-member means used to maintain the continuous outer frame means in an erected orientation, as well as the flanged portions of one of the ends of each of the cross-member means operably secured against the outer peripheral surface of a corresponding slot means;

FIG. 4 of the drawings is a perspective view of a substantially linear shaft which is used to form one of the continuous outer frame means of FIG. 3, showing, in particular, the slot means operably formed at predetermined locations thereon, as well as the pre-softened regions which will facilitate appropriate bending thereat;

FIG. 5 of the drawings is an enlarged cross-sectional view of one of the cross-member means of FIG. 1 as well as the corresponding slot means of the continuous outer frame means, showing, in particular, the collar portion and flange portion of the end of the cross-member means operably compressing the inner and outer peripheral surfaces, respectively, of the slot means so as to result in a locked compression fit of the cross-member to the continuous outer frame means, as well as showing an optional ferrule inserted within the channel region of the end of the cross-member means;

FIG. 6 of the drawings is an enlarged cross-sectional view of a cross-member means secured to a corresponding slot means in the continuous outer frame means, showing, in particular, the pinched, or crimped, collar portion of the cross-member means operably positioned adjacent the inner peripheral surface of the slot means;

FIG. 7 of the drawings is an enlarged cross-sectional view of an alternative embodiment of the invention, showing, in particular, a substantially solid I-beam construction for the continuous outer frame means, as well as the lockable securement of one end of the cross-member means to a slot in the I-beam, as well as showing an alternative double-backed flange portion of the cross-member means operably positioned adjacent the outer peripheral surface of the corresponding slot;

FIG. 9 of the drawings is an enlarged cross-sectional view of a cross-member means operably secured within a slot of an alternative embodiment of the continuous outer frame means, showing, in particular, the first and second halves of the continuous outer frame means which collectively describe a single, unitary frame portion; and FIG. 10 of the drawings is an elevated enlarged break-away perspective view of the continuous outer frame means of FIG. 9, showing, in particular, the collar and flange portion of a corresponding cross-member means operably positioned adjacent the inner and outer peripheral surfaces, respectively, of the corresponding slot means.

DETAILED DESCRIPTION OF THE DRAWINGS

Figure 1:
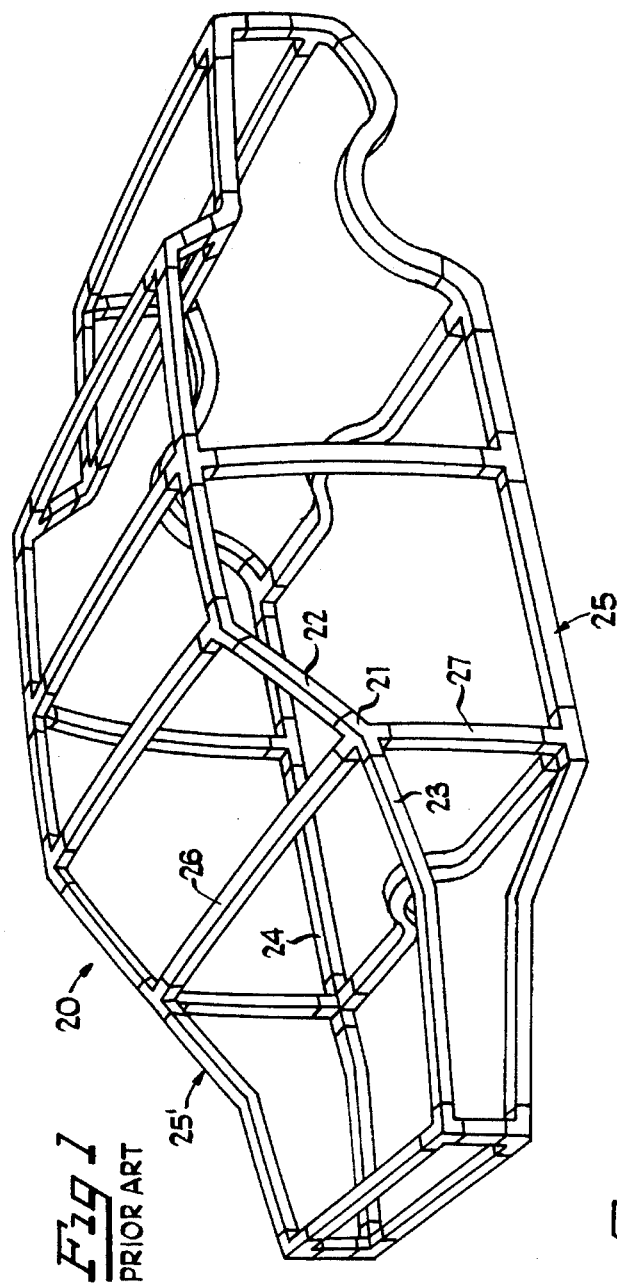
FIG. 1 of the drawings is a perspective view of a prior art automotive space frame showing, in particular, the plurality of individual segmented frame portions and the plurality of connecting nodes used for connecting each of the individual segments together.

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

Figure 2:
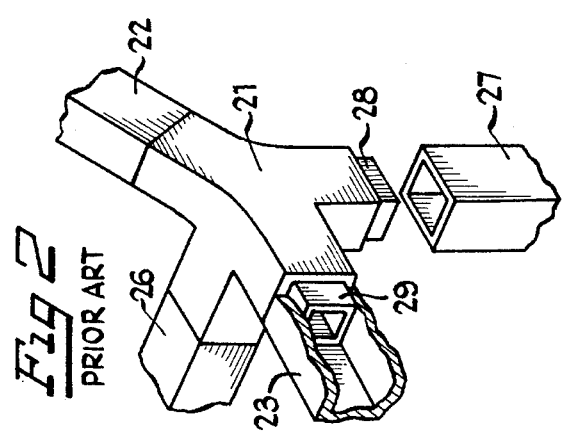
FIG. 2 of the drawings is an enlarged sectional view, in partial cross-section, of a prior art connecting node of FIG. 1, showing, in particular, the operable positioning of the ends of the nodes into hollow end regions of corresponding ones of the individual segmented frame portions, and, into the hollow ends of the corresponding cross-members.

Prior art automotive space frame 20 is shown in FIG. 1 as including a plurality of tubular individual frame portions, such as individual frame portions 22 through 24, a plurality of tubular cross-members, such as cross-members 26 and 27, and a plurality of connecting elements, or nodes, such as node 21 (FIG. 2). As shown in detail in FIG. 2, each of the nodes include insertion ends, such as insertion ends 28 and 29, which are insertable into the hollow end portions of corresponding ones of the individual frame portions, such as frame portions 22 and 23, and into the hollow end portions of corresponding ones of the cross-members, such as cross-members 26 and 27. Actual securement of the insertion ends of the nodes within the hollow ends of the prior art cross-members and within the individual frame portions can be accomplished through conventional welding techniques and/or through the use of adhesive bonding. Once fully connected, prior art space frame 20 will include two outer frame members 25 and 25' comprised of a plurality of individually-connected frame portions, a plurality of connecting nodes, and a plurality of cross-members which will maintain the outer frame members in an erected orientation.

Space frame apparatus 30 of the present invention is shown in FIG. 3 as comprising two continuous outer frame means 31 and 32 and cross-member means 34 through 48. Continuous outer frame means 31 and 32 both include a plurality of pre-selected attachment regions (slot means), such as slot means 50 through 58, as shown more clearly on substantially linear shaft 31' (FIG. 4), which will be used to form continuous outer frame means 31, and a plurality of bent regions, such as bent regions 61 through 66. As will be further explained in detail hereinbelow, each of the bent regions are formed as the result of softening predetermined locations 61' through 66' on substantially linear shaft 31' (FIG. 4) through localized heating, and then bending the shaft at each of the predetermined softened locations to varying predetermined radii in predetermined directions so as to conform to a specific vehicle configuration, such as the vehicle configuration shown in FIG. 3. Slots, such as slot 52 (FIG. 5), which operably accept a portion of corresponding ones of the cross-member means, such as cross-member means 36, each include an inner peripheral surface 90, an outer peripheral surface 91 and an inner dimension 92.

Cross-member means, such as cross-member means 36, is shown in FIG. 5, as including a first end, such as first end 70, a second end (not shown), an interior surface, such as interior surface 72, and an inner dimension defining a channel region 73. The first and second ends of the cross-member means each include a distal end, such as distal end 80, having a flange portion, such as flange portion 83, and a proximal end, such as proximal end 81, having a detent, or collar portion, such as collar portion 82. In this embodiment, collar portion 82 may be formed by swaging first end 70 of the cross-member means—although other techniques for forming the collar, such as by pinching or crimping, are also contemplated.

Each of the first and second ends of the cross-member means are operably inserted into a corresponding slot, such as corresponding slot 52 (FIG. 5) where they are then secured in place so as to maintain space frame apparatus 30 in an erected orientation, as shown in FIG. 3. As will be explained in detail, such securement results from a locked joint between the ends of the cross-member means and the corresponding slots. Such a locked joint is achieved as the result of the collar portion, such as collar portion 82, of the cross-member means, such as cross-member means 36, compressing against inner peripheral surface, such as inner peripheral surface 90, of corresponding slot 52, and then forming and positioning flange portion, such as flange portion 83, so that it is squeezing against outer peripheral surface, such as outer peripheral surface 91, of corresponding slot 52—so as to result in a compression fit therebetween. As will also be explained, such flanged and collared portions are formed by softening the respective distal and proximal ends of the cross-member means through localized heating, and then deforming same until the collar and flange portions are created.

Strength enhancement means 95 is shown in alternative form in FIG. 5 as comprising a sleeve member, or ferrule, having an outer surface 96, an inner edge 97, and an outer edge 98. The sleeve member is inserted within channel region 73 of a respective end, such as first end 70, of cross-member means, such as cross-member means 36, so as to increase rigidity to the joint formed upon insertion of the respective ends of the cross-member means within the corresponding slot means, such as slot means 52. Securement of sleeve member 95 to the cross-member means can be obtained by way of an interference fit between outer surface 96 of the sleeve member and at least a portion of channel region, such as channel region 73 (FIG. 5), of the respective end of the corresponding cross-member means—although other conventional securement techniques, such as welding or adhesive bonding of the sleeve member to the cross-member means are also contemplated. Also shown in FIG. 5 is an alternative construction of the continuous outer frame means wherein the continuous outer frame means may be constructed from two halves 125 and 126 which are secured together by keyed portions 127 and 128. In addition to such keyed portions, further securement can be maintained by, for example, welding.

An alternative construction of collar portion 82' is shown in FIG. 6 wherein the collar portion is operably positioned adjacent inner peripheral edge 90 of corresponding slot means 52. Such a collar portion is formed as the result of pre-softening proximal end 81 of first end 70 of the cross-member means, and then pinching the softened region until the collar is formed—as opposed to swaging. Although this embodiment is shown without the use of a ferrule, such reinforcement is indeed contemplated.

Figure 8:
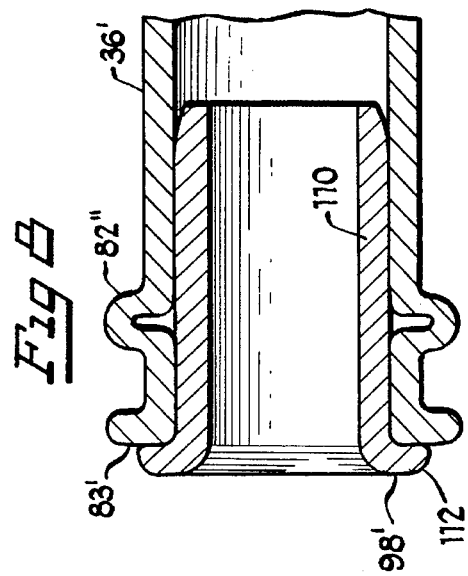
FIG. 8 of the drawings is an enlarged cross-sectional view of the cross-member means of FIG. 7, showing, in particular, the operable positioning of a sleeve member within the channel region of the end of the cross-member, as well as showing the flanged outer end of the sleeve member operably positioned adjacent the flange portion of the cross-member means.

Cross-member means 36' is shown in FIG. 7 and FIG. 8 as being operably attached within a corresponding slot means, such as slot means 52' of continuous outer frame means 100 (FIG. 7) having I-beam configuration. The corresponding cross-members means, such as cross-member means 36' is operably secured within slot means 52' and, in turn, to continuous outer frame means 100, through a compression fit, wherein the flange and collar portions 83' and 82", respectively, of the cross-member means, are operably squeezed and maintained about extending portions 103 and 104 of the I-beam.

Also shown in FIG. 7 and FIG. 8, is alternative double-backed flange portion 106 (FIG. 7) which may be used for providing additional securement to the locked joint, as well as utilization of sleeve member 110 (FIG. 8). Although the sleeve member has substantially the same configuration as that of sleeve member 95, as shown in FIG. 5, sleeve member 110 additionally includes outer end 98' having a flange portion 112 which extends beyond the outer peripheral surface of the corresponding slot means, as well as past flange portion 83' (FIG. 8) of the corresponding cross-member means. Such a flange on the sleeve member can be used to provide additional securement to the joint, and/or additional securement to the cross-member means itself. Although not shown, such additional securement can be further obtained through welding or bending the sleeve member, through adhesive, to the end of a corresponding cross-member means. Furthermore, it is also contemplated that when such a flanged sleeve member is used, the distal end of the corresponding end of the cross-member means may be constructed without a flange portion. Accordingly, lockable engagement of the cross-member means to the continuous outer frame means will occur through a compression fit, adjacent a corresponding slot, as a result of the flange on the sleeve member, and the collar portion on the proximal end of a respective end of the cross-member means, squeezing the respective inner and outer peripheral surfaces of the corresponding slot means.

An alternative embodiment of continuous outer frame means 130 is shown in FIG. 9 and FIG. 10 as comprising first half 131 and second half 132. Each of these halves include lip portions 133, 134 and 135, 136, respectively, which are secured together so as to form a single unitary frame portion. When such a configuration is utilized, a predetermined segment of the lip portions will be removed upon formation of the slots so as to facilitate operable acceptance of the corresponding ends of the cross-member means, and in turn, formation and position of the flange and collar portions about same. Although substantially rectangular and I-beam configured continuous outer frame means have been shown, other configurations, such as circular and hexagonal, among others, are also contemplated.

The process for constructing space frame apparatus 30 (FIG. 1) is achieved by first extruding linear sections, such as linear section 31' (FIG. 4) and then quenching the extrusions at press. Although several types of material can be used for such extrusions, aluminum alloys of the 6000-series of having varying hardnesses are preferred. Furthermore, although hollow extrusions are preferred for purposes of fabricating the one or more continuous outer frame means 31 and 32 (FIG. 1) (due to their relatively light weight and minimized material requirements) solid extrusions, such as extrusions having an I-beam configuration 100 (FIG. 7), as well as non-extruded sections, are also contemplated for use.

After the extrusions have been quenched, they are substantially straightened and then heat treated and cut to a particular length suitable for the particular vehicle configurations required. Accordingly, once cut to length, a required number of slots, such as slots 50 through 58 (FIG. 4), are formed in the extrusions for eventual acceptance of the end portions of corresponding cross-members 34–48 (FIG. 3). Such slots can be formed through a punching operation, in conformance with a predetermined pattern relative to the structural connection required for a specific vehicle configuration, or, they may be formed by any other conventional slot forming techniques.

After the slots have been formed in the extrusions, a specified number of predetermined regions, such as predetermined regions 61' through 66' (FIG. 4), are softened through localized heating so as to at least temporarily increase ductility to the linear extrusions at the predetermined softened regions. One such acceptable method for softening the predetermined regions by localized heating is disclosed in U.S. Pat. No. 4,766,664, issued to Joseph C. Benedyk, for a Process for Formation of High Strength Aluminum Ladder Structures. In such a process, an induction coil is placed in operable contact with the specific area to be heated, and, in turn, softened—with only minimal conductivity to adjacently positioned portions of the softened region. Although the use of an induction coil can be used (such as disclosed in U.S. Pat. No. 4,766,664), other types of conventional heating processes for temporarily increasing ductility to localized areas are also contemplated.

After the longitudinal extrusions have been locally softened, each of the predetermined regions are bent to varying radii in predetermined directions relative to a specific vehicle configuration. It is contemplated that such bending be performed either manually, or on automated bending equipment pre-programmed with the particular bending requirements and bending locations relative to specific vehicle configurations. Accordingly, such bending will result in the formation of one or more continuous outer frame portions, such as outer frame portions 31 and 32 (FIG. 3), constructed substantially from a single, substantially uninterrupted extrusion.

Upon completion of the formation of the continuous outer frame portions, each of the locally softened regions are then allowed to harden toward their pre-softened hardness, as desired. The amount of hardness which will be regained will be dependent upon the specific type of alloy used for formation of the continuous outer frame portions, the amount of precipitation in the alloy prior to heating, intensity of the heat applied, as well as the length of time in which the heat is applied to the specific predetermined regions.

In addition to the continuous outer frame members being extruded, the process also includes extruding cross-members 34–48 (FIG. 3) to have first ends, such as first end 70 (FIG. 5), second ends (not shown), and a distal and proximal end, such as distal and proximal ends 80 and 81 (FIG. 5), respectively, at each of the first and second ends. After the cross-members have been extruded, the respective proximal ends are locally softened by the same or similar localized heating process as that used for the continuous outer frame members. Once softened, the proximal ends are deformed so as to form a collar portion, such as collar portions 82 (FIG. 5) and 82' (FIG. 6). The formation of collar portion 82 (FIG. 5) may be accomplished through the use of conventional swaging techniques, while formation of collar portion 82' (FIG. 6) may be formed by merely pinching, or crimping the softened portion of the cross-member. After the collar portions are formed, they are allowed to harden back toward their pre-softened hardness through conventional hardening methods.

Once the collar portions have been formed, the respective first and second ends of the cross-member means can be operably inserted within a corresponding slot, such as slot 52 (FIG. 5), until distal ends, such as distal end 80, extends through and past outer peripheral surface, such as outer peripheral surface 91, of the slot so as to form a joint therebetween. After the joint has been created, distal ends, such as distal end 80, can be softened through localized heating and then deformed so as to form a flange portion, such as flange portion 83 (FIG. 5) which is then allowed to harden back toward its pre-softened hardness. The flange portion and the collar portion will be situated so that the flange portion is squeezing against the outer peripheral surface, such as outer peripheral surface 91 (FIG. 5) of the corresponding slot 52, and collar portion 82 will be squeezing against the inner peripheral surface, such as inner peripheral surface 90, of the slot so as to result in a compression fit therebetween, to, in turn, lock the respective cross-members to the continuous outer frame portions.

Should additional reinforcement of the joint be required, insertion of a sleeve member, or ferrule, such as sleeve member 95 (FIG. 5), or sleeve member 110 (FIG. 8) within the channel region, such as channel region 73 (FIG. 5) of the first and second ends of the cross-members can be used. As shown in FIG. 5, such a sleeve member can be inserted completely within the channel region of the respective ends of the cross-members, and, in turn, completely within the corresponding slot. Alternatively, the sleeve members can have their outer ends, such as outer end 98' (FIG. 8), extending beyond the distal ends of the respective end of the corresponding cross-member. Accordingly, when such an end extending sleeve member is used, its outer end can be softened through localized heat induction, and then deformed so as to create a flange portion 112 (FIG. 8) for further securement with and/or to the cross-member. Such a sleeve member can be further attached to the cross-member through an interference fit therebetween and/or through welding or adhesive bonding.

The foregoing description and drawings merely explain and illustrate the invention and the invention is not limited thereto except insofar as the appended claims are so limited as those skilled in the art who have the disclosure before them will be able to make modifications and variations therein without departing from the scope of the invention.

What is claimed is:

1. A space frame apparatus for use in the construction of various vehicles, such as automotive and aviation vehicles, wherein said space frame apparatus is intended to structurally bear a substantial load of such a vehicle when fully assembled, said space frame apparatus comprising:

one or more continuous outer frame means for providing an outer frame for a vehicle, said one or more continuous outer frame means each including one or more preselected attachment regions;

one or more cross-member means each having at least a first end operably attached to said one or more outer frame means at corresponding ones of said one or more preselected attachment regions for increasing the structural rigidity thereof, as well as for operably articulating said one or more continuous outer frame means of said space frame apparatus, into an erected orientation;

slot means integrally formed through at least a portion of one or more said preselected attachment regions for operably accepting at least a portion of corresponding respective ones of said first ends of said one or more cross-member means; and securement means operably associated with at least a portion of each of said first end of said one or more cross-member means and said corresponding slot means for operably securing said first end of said one or more cross-member means within said corresponding slot means of said one or more continuous outer frame means to, in turn, securely maintain said space frame apparatus in said erected orientation, said securement means further including at least a portion of said first end of said cross-member means being softened through localized heating and then deformed so as to maintain said restrained operable positioning of said first end within said corresponding slot means, said localized heating including means for precluding migration, and, in turn, conductivity, of heat beyond those portions of said cross-member means being softened.

2. The invention according to claim 1 wherein said operable acceptance of said at least first end of said cross-member means within said corresponding slot means describes a joint therebetween said cross-member means and said one or more continuous outer frame means:

said space frame apparatus further including strength enhancement means operably associated with said joint for imparting increased structural integrity thereto, to, in turn, increase rigidity against imparted stress at said joint.

3. The invention according to claim 2 wherein said one or more cross-member means further includes an interior surface defining a channel region and a wall having a finite thickness:

said strength enhancement means comprising at least one sleeve member operably positioned within at least a portion of said channel region of said one or more cross-member means adjacent said interior surface of at least said first end of same, so as to reinforce said finite wall thickness of said cross-member means within said joint.

4. The invention according to claim 3 wherein each of said at least first ends of said one or more cross-member means have an inner dimension and said at least one sleeve member has an outer dimension so as to collectively describe an interference fit therebetween:

said interference fit serving to maintain said at least one sleeve member within at least a portion of said channel region of said first ends of corresponding ones of said one or more cross-member means.

5. The invention according to claim 4 wherein said sleeve member includes an inner edge operably positioned within said channel region of a corresponding one of said at least first end of said one or more cross-member means and an outer edge extending through and past a corresponding one of said slot means, and said slot means includes an inner peripheral surface and an outer peripheral surface:

said securement means further including at least a portion of said outer edge of said sleeve member being softened through localized heating and then deformed so as to result in a flange portion operably positioned adjacent said outer peripheral surface of said slot means to, in turn, further enhance securement of respective ones of said at least first end of said one or more cross-member means within said corresponding slot means.

6. The invention according to claim 5 wherein said at least first end of said one or more cross-member means include a proximal end operably positionable adjacent said inner peripheral surface of said slot means:

each of said proximal ends being softened through localized heating and then deformed so as to form a detent portion adjacent said inner peripheral surface of a corresponding one of said slot means.

7. The invention according to claim 2 wherein each of said slot means have an inner dimension and each of said at least first end of said one or more cross-member means have an outer dimension so as to collectively describe an interference fit therebetween:

said interference fit serving to maintain at least a portion of said at least first end of said one or more cross-member means within at least a portion of a corresponding one of said slot means.

8. The invention according to claim 1 wherein said at least first end of said one or more cross-member means includes a distal end and a proximal end wherein said distal end extends through and past said corresponding slot means in which said at least first end is positioned, and, each of said slot means include an inner peripheral surface and an outer peripheral surface, said securement means further including:

said proximal end being softened through localized heating and then deformed so as to form a detent portion adjacent said inner peripheral surface of a corresponding one of said slot means, and said distal end being softened upon localized heating and then deformed so as to form one or more flanged regions operably positioned adjacent said outer peripheral surface of said corresponding slot means so as to create a substantially locked joint relative to said at least first end of said one or more cross-member means and said corresponding slot means.

9. The invention according to claim 1 wherein said one or more continuous frame means comprises two or more continuous outer frame portions, said two or more continuous outer frame portions including one or more pre-softened regions softened through localized heating at said pre-softened regions for facilitating bending of said two or more continuous outer frame portions at varying radii in any desired dimension.

10. The invention according to claim 1 wherein said one or more continuous outer frame means each comprise a first half and a second half operably secured together so as to collectively form a unitary frame portion.

11. The invention according to claim 1 wherein each of said one or more continuous outer frame means and said one or more cross-member means are each constructed of aluminum material from the group comprising 6000-series alloys of varying hardnesses.

12. A process of manufacturing a space frame apparatus of the type for use in the construction of various vehicles, such as automotive and flying vehicles, wherein the space frame apparatus is constructed with one or more bendable outer frame members having preselected attachment regions located thereon, the process comprising the steps of:

forming slots in the one or more bendable outer frame members at the preselected attachment regions, wherein the slots include an inner peripheral surface and an outer peripheral surface;

softening predetermined areas on the one or more outer frame members through localized heating;

bending the one or more bendable outer frame members at each of the predetermined areas to varying predetermined radii in predetermined directions relative to a specific vehicle configuration;

at least partially hardening the predetermined softened areas after bending the one or more bendable outer frame members so as to increase structural integrity to the predetermined areas;

forming at least one cross-member with at least a first end having a distal end, a proximal end and a cross-sectional configuration;

softening the proximal end of the at least one cross-member through localized heating wherein the localized heating substantially precludes migration, and, in turn, conductivity, of heat beyond the proximal end of the at least one cross-member being softened;

inserting the first end of the at least one cross-member in corresponding ones of the slots in the bent one or more outer frame members so as to form a joint therebetween each respectively;

deforming at least a portion of the softened proximal ends of each of the first ends so as to alter the pre-deformed cross-sectional configuration of same to, in turn, create a detent portion operably positioned adjacent the inner peripheral surface of a corresponding slot for precluding over insertion of the first ends into the corresponding slots in the one or more outer frame members; and hardening the locally softened proximal ends back toward the pre-softened hardnesses.

13. The invention according to claim 12 in which the process of manufacturing a space frame apparatus further includes the steps of:

softening the distal ends of the first ends of the at least one cross-member through localized heating;

deforming at least a portion of the softened distal ends of the first ends of the at least one cross-member so as to form a flange portion operably positioned adjacent the outer peripheral surface of corresponding ones of the slots; and hardening the locally softened distal ends back toward their pre-softened hardnesses, after the step of softening the proximal ends of the at least one cross-member through localized heating, the flange portion and the detent portion compressing against the outer and inner peripheral surface, respectively, of the slots, so as to substantially lock the first ends within the corresponding slots.

14. The invention according to claim 12 in which the process of manufacturing a space frame apparatus further includes the step of increasing structural integrity to the joint after the step of forming the at least one cross-member, said step of increasing the structural integrity to the joint comprising the step of inserting at least a portion of a sleeve member within at least a portion of the at least first end of the at least one cross-member prior to the step of inserting the at least first end of the at least one cross-member in corresponding ones of the slots.

15. The process according to claim 14 wherein the sleeve member includes an outer end and an inner end, and the at least first ends of the at least one cross-member includes a channel region;

the step of inserting the at least first ends of the at least one cross-member in corresponding ones of the slots further includes the steps of:

inserting the inner end of the sleeve member within the channel regions of the at least one cross-member;

inserting the at least first ends of the at least one cross-member, and, in turn, the sleeve member into a corresponding one of the slots until at least a predetermined portion of the outer end of the sleeve member extends past the outer peripheral surface of a corresponding ones of the slots;

softening the outer end of the sleeve member through localized heating;

deforming at least a portion of the softened outer end of the sleeve member so as to form a flanged portion operably positioned adjacent the outer peripheral surface of the corresponding slot; and hardening the locally softened outer end of the sleeve member back toward its pre-softened hardnesses.

16. The process according to claim 15 in which the step of deforming at least a portion of the softened outer end of the sleeve member comprises the step of swaging the softened outer end.

17. The invention according to claim 12 in which the process of manufacturing a space frame apparatus further includes the steps of extruding a billet so as to form one or more substantially straight extrusions to be used as the one or more bendable outer frame members, prior to the step of forming slots in the one or more bendable outer frame members at the preselected attachment regions.

18. The process according to claim 17 in which the step of bending the one or more bendable outer frame members at each of the predetermined areas to varying predetermined radii in predetermined directions relative to a specific vehicle configuration further includes the step of positioning the bent portions of the one or more bendable outer frame members in any desired dimension so as to form a space frame apparatus constructed from one or more continuous outer frame members.

* * * * *